United States Patent
Houg

(10) Patent No.: US 6,360,286 B1
(45) Date of Patent: *Mar. 19, 2002

(54) SEQUENTIAL DATA TRANSFER WITH COMMON CLOCK SIGNAL FOR RECEIVER AND SEQUENTIAL STORAGE DEVICE AND WITH SLACK REGISTER STORING OVERFLOW ITEM WHEN SET-UP TIME IS INSUFFICIENT

(75) Inventor: Todd C. Houg, St. Francis, MN (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/705,227

(22) Filed: Nov. 2, 2000

Related U.S. Application Data

(63) Continuation of application No. 09/119,979, filed on Jul. 21, 1998, now Pat. No. 6,163,819.

(51) Int. Cl.[7] .............................. G06F 3/00; G06F 3/06; G06F 1/04; G06F 5/06
(52) U.S. Cl. .............................. 710/29; 710/57; 710/74; 713/600; 709/239
(58) Field of Search .............................. 710/1, 20, 29, 710/31, 57, 74; 713/400, 600; 709/239

(56) References Cited

U.S. PATENT DOCUMENTS

| | | |
|---|---|---|
| 4,700,358 A | 10/1987 | Duncanson et al. ........ 375/222 |
| 5,046,190 A | 9/1991 | Daniel et al. |
| 5,329,493 A | 7/1994 | Meyer et al. |
| 5,422,879 A | 6/1995 | Parsons et al. |
| 5,619,544 A | 4/1997 | Lewis et al. |
| 5,619,681 A | 4/1997 | Benhamida et al. ........ 395/500 |
| 5,680,504 A | 10/1997 | Kopp |
| 5,696,990 A | 12/1997 | Rosenthal et al. |
| 5,987,081 A | * 11/1999 | Csoppenszky et al. ...... 375/354 |
| 5,999,742 A | 12/1999 | Richards et al. ............ 395/821 |
| 6,003,064 A | 12/1999 | Wicki et al. |
| 6,011,799 A | 1/2000 | Kerstein et al. |
| 6,052,751 A | * 4/2000 | Runaldue et al. ........... 710/107 |
| 6,088,812 A | 7/2000 | Houg |
| 6,105,083 A | * 8/2000 | Kurtze et al. ................. 710/29 |
| 6,112,268 A | * 8/2000 | Ohashi et al. ................ 710/52 |
| 6,141,691 A | * 10/2000 | Frink et al. ................. 709/233 |
| 6,161,189 A | * 12/2000 | Arimilli et al. ............. 713/600 |
| 6,266,778 B1 | 7/2001 | Bell ............................ 713/400 |
| 6,269,414 B1 | 7/2001 | Engdahl ..................... 710/101 |
| 6,282,587 B1 | 8/2001 | Priem et al. .................. 710/23 |

* cited by examiner

Primary Examiner—Thomas Lee
Assistant Examiner—Tanh Q. Nguyen
(74) Attorney, Agent, or Firm—Dorsey & Whitney LLP

(57) ABSTRACT

The present invention provides a circuit for saving overflow data within a sequence of data that are to be clocked out of a sequential storage device. The sequential storage device has a data output to clock out data in response to a flow control signal being asserted. The sequential storage device terminates this clocking out of the data in response to the flow control signal being deasserted. However, overflow data may be relinquished by the sequential storage device and clocked out of the data output even after the flow control signal has been deasserted. The circuit includes a slack register that is connected to the data output of the sequential storage device. The slack register stores the overflow data for when the flow control signal is again asserted.

28 Claims, 4 Drawing Sheets

SEQUENTIAL DATA TRANSFER WITH COMMON CLOCK SIGNAL FOR RECEIVER AND SEQUENTIAL STORAGE DEVICE AND WITH SLACK REGISTER STORING OVERFLOW ITEM WHEN SET-UP TIME IS INSUFFICIENT

RELATED APPLICATION DATA

This application is a continuation of U.S. patent application Ser. No. 09/119,979, filed Jul. 21, 1998, now U.S. Pat. No. 6,163,819, which is related to U.S. patent application Ser. No. 09/119,763, for SEQUENTIAL DATA TRANSFER CIRCUIT, filed Jul. 21, 1998, now U.S. Pat. No. 6,088,812.

TECHNICAL FIELD

The present invention relates generally to data communications within a computer. In particular, the present invention relates to the use of a slack register for time critical data flow control.

BACKGROUND OF THE INVENTION

In a PCI transaction, a sequence of data items may be transferred in a pipelined fashion between an initiator and a target. The sequence of data items may be transferred either from a host bus buffer (which may be the initiator or the target) to a PCI agent (which is the target or the initiator, respectively) or from a PCI agent to the host bus buffer. For example, a PCI agent could initiate (as the initiator) a data read from the host bus (i.e., the target in this case).

The data items are sequentially clocked between the initiator and the target (e.g., between the initiator buffer and target buffer). The target and initiator each have an associated flow control signal (TRDY# and IRDY#, respectively) that is asserted when the target/initiator is ready for a data item to be transferred. For example, when an initiator initiates a read from a target, the TRDY# signal is asserted when the target is ready to send a data item to the initiator, and correspondingly the initiator asserts an IRDY# when it is ready to receive the data item. Thus, a data item will not be transferred in response to a clock trigger unless both the TRDY# and IRDY# signals are asserted during the clock trigger.

FIG. 1A shows a sequential storage device 10, such as a first-in, first-out ("FIFO") buffer or random access memory ("RAM") that serves as a data buffer for a target (e.g., the host bus). The device 10 includes a clock input 11, an active-low chip enable input 13, and a data output 15. Also shown is a receiver (e.g., an initiator) 12 having a flow control (e.g., IRDY#) output 14, a receiver clock input 16, and a receiver data input 18 for reading data received from the sequential storage device 10. The data output 15 of the sequential storage device 10 is in communication with the receiver data input 18 of receiver 12. A clock signal 17 is connected to storage clock input 11 and receiver clock input 16. In addition, an IRDY# signal 19 is outputted from flow control output 14 and connected to storage chip enable input 13. The clock signal 17 is a 66 MHZ PCI clock. The IRDY# signal 19 is a flow control signal for controlling the flow of data into the receiver (in this case, initiator) 12.

FIG. 1B shows a timing diagram for an illustrative initiator read operation for the sequential storage device 10 of FIG. 1A. The timing diagram shows a clock signal 17, an IRDY# signal 19, output data 215, and read data 212 which is data read by receiver (initiator) 12. If the IRDY# signal is asserted concurrent with a clock trigger, the clock trigger causes: (1) the initiator to read the current data item at data output 15 and (2) the sequential storage device 10 to clock the next data item out to data output 15. If the IRDY# signal is deasserted concurrent with a clock trigger, the initiator does not read the current data item at data output 15 in response to the clock trigger. (It may be assumed for purposes of this illustration that any other necessary control signals, e.g., TRDY#, for transferring data are asserted.)

On one hand, with a 33 MHZ PCI bus, the ERDY# and TRDY# signals provide at least a 6 or 7 nanoseconds ("nsec.") set-up time prior to a clock trigger. This set-up time is predictably and consistently sufficient for enabling and disabling the sequential storage device 10. On the other hand, however, the 66 MHZ PCI bus specification (as shown in FIG. 1B) guarantees only a 3 nsec. set-up time for TRDY# and RDY# prior to a clock trigger. Unfortunately, 3 nsec. may not be sufficient for consistently enabling and disabling (through the chip enable input 13) the sequential storage device 10. Thus, as is shown in FIG. 1B, the deassertion (i.e., the IRDY# signal switching from a low state to a high state) of IRDY# during cycle 3 fails to meet the set-up time necessary to ensure that the sequential storage device 10 will not clock out the next data item (Data 4). Thus, data output from sequential storage device 10 during cycle 4 and thereafter is indeterminate. In addition, this deassertion of IRDY# indicates that the initiator will not read the current data item (Data 3) at the data output 15 in response to the next clock trigger (clock trigger 4). During cycle 5, the IRDY# signal is once more asserted indicating that the initiator will read the current data item (indeterminate data) in response to the following clock trigger (clock trigger 6), which is the first clock trigger subsequent to the assertion of IRDY#. Consequently, as shown in FIG. 1B, the overflow data item (i.e., the data item that was clocked out following the deassertion of the IRDY# signal) in this case Data 3, may be lost because the initiator failed to read it in response to the fourth clock trigger, which nonetheless may have clocked out the next data item. Also, the sequential storage device 10 may be out of synch with data transfers causing all subsequent transfers to be indeterminate. This loss of the overflow data item occurs regardless of whether the assertion of IRDY# in cycle 5 allows sufficient time to enable the sequential storage device 10 for the following clock trigger (clock trigger 6).

Accordingly, what is needed is a method and apparatus for transferring a sequence of data items with critically small flow control set-up times from a first sequential storage device to a receiver, such as an initiator buffer. In particular, what is needed is a way to transfer a sequence of data items between an initiator and a target (or vice versa) over a PCI bus when the flow control signals may not provide sufficient set-up times for disabling the source sequential storage device from overflowing an overflow data item in response to a clock trigger following deassertion of a flow control signal.

SUMMARY

One embodiment of the present invention provides a circuit for transferring a sequence of data out of a sequential storage device, which is controlled by a flow control signal that may have an inadequate set-up and hold time. The sequential storage device has a data output to clock out data in response to a flow control signal being asserted. The sequential storage device terminates this clocking out of the data in response to the flow control signal being deasserted. However, overflow or indeterminate data may be relinquished by the sequential storage device and clocked out of the data output even after the flow control signal has been deasserted. The circuit includes a slack register that is connected to the data output of the sequential storage device. The slack register stores the overflow data until the flow control signal is again asserted.

DETAILED DESCRIPTION

A. Circuit Structure

Figure 1A:
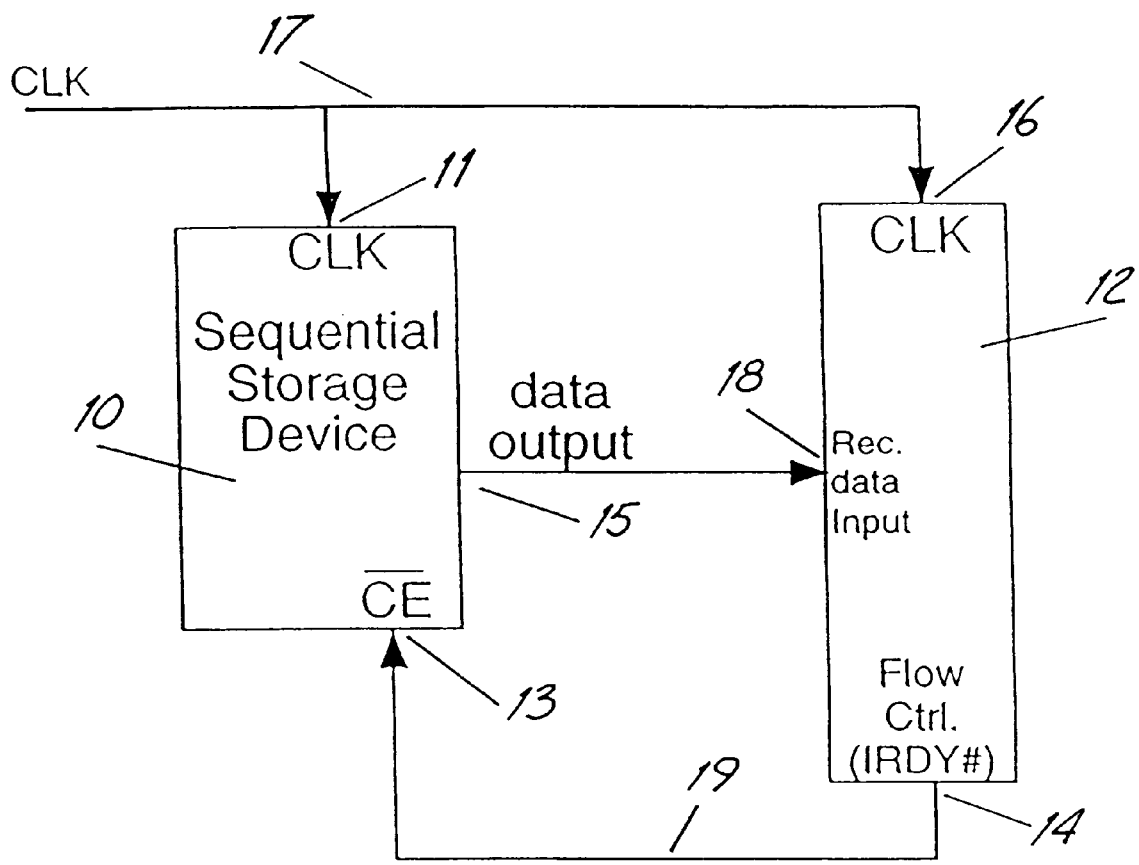
FIG. 1A depicts a simplified prior art data transfer circuit.
Figure 1B:
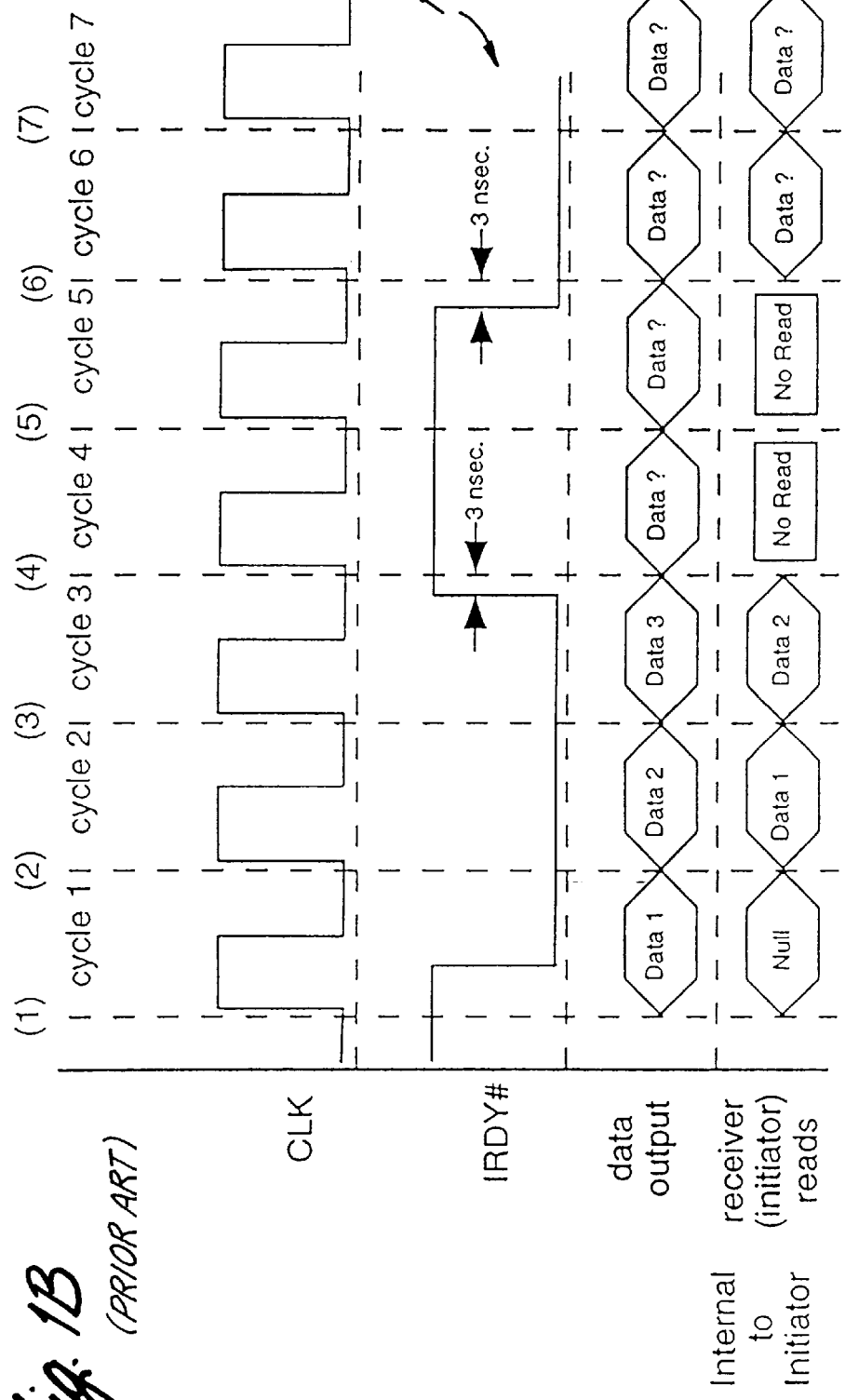
FIG. 1B shows a timing diagram depicting an exemplary operation of the sequential storage device of FIG. 1A.
Figure 2:
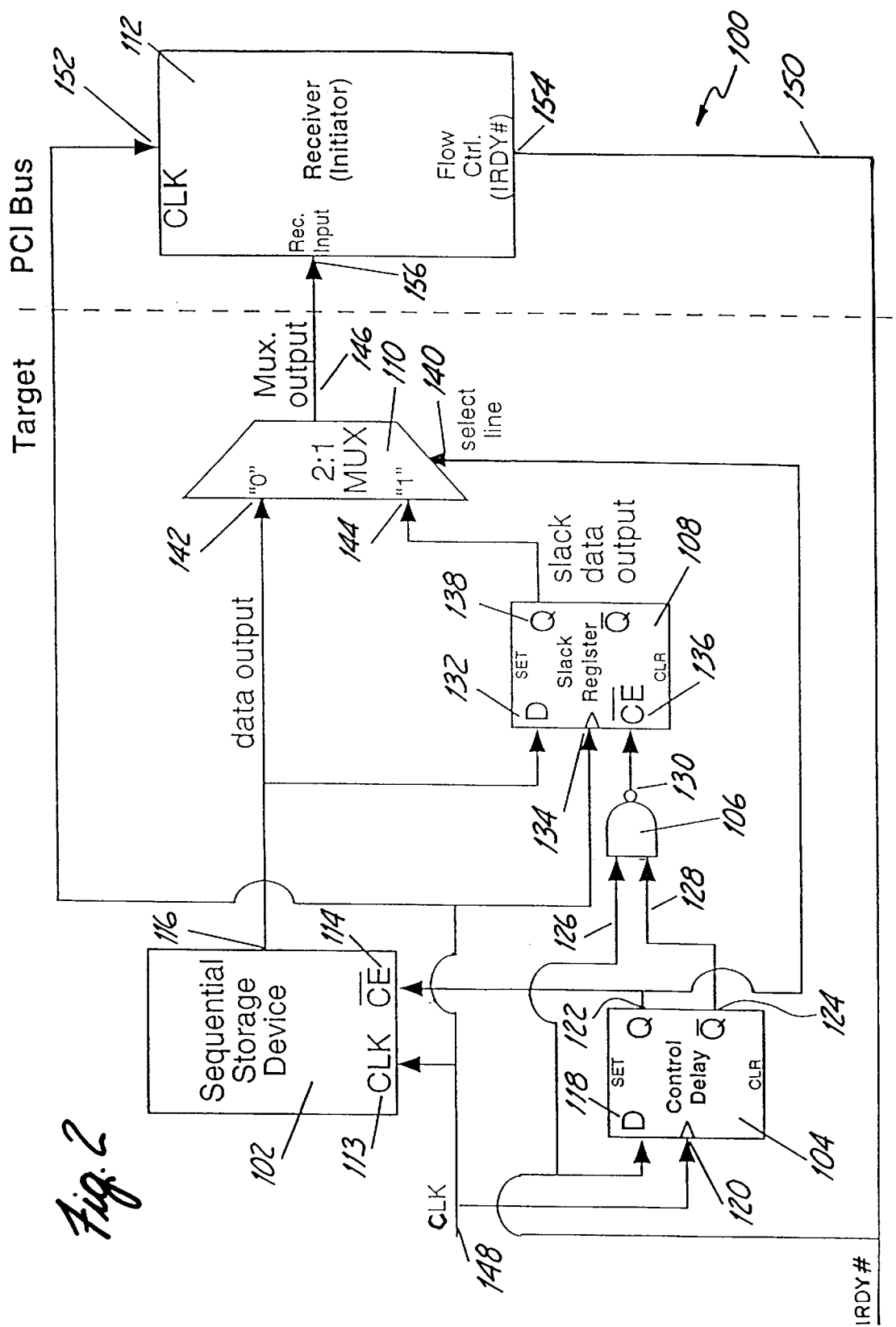
FIG. 2 shows an embodiment of a circuit for the present invention.

With reference to FIG. 2, circuit 100, which is one embodiment of the present invention, will be described. Circuit 100 comprises a sequential storage device 102, a control delay register 104, a NAND gate 106, a slack register 108, and a two-line multiplexer 110 and a receiver 112. The sequential storage device 102 has a storage clock input 113, a storage chip enable input 114 (active-Low), and a data output 116.

Continuing to refer to FIG. 2, the control delay register 104 is a rising (or positive) edge-triggered D-flip flop. The control delay register 104 has a control delay signal input 118, a control delay clock input 120, a control delay output 122, and an inverted, delayed flow control output 124, which is the compliment of the control delay output 122.

Continuing to refer to FIG. 2, the NAND gate 106 has a first gate input 126, a second gate input 128, and a gate output 130.

The slack register 108 comprises a slack data input 132, a slack clock input 134, a slack chip enable input 136, and slack output 138. The two line multiplexer 110 comprises a select input 140, a first data input 142, a second data input 144, and a read output 146. The receiver 112 includes receiver clock input 152, flow control output 154, and receiver input 156.

A clock signal 148 is electrically connected to the storage clock input 113 of the sequential storage device 102, the control delay clock input 120 of the control delay register 104, the slack clock input 134 of the slack register 108, and the receiver clock input 152 of the receiver (e.g., initiator) 112. A flow control signal 150 (which in the depicted embodiment is an IRDY# signal for an initiator on a PCI bus) is outputted from flow control output 154 of receiver 112 and connects to the control delay signal input 118 of the control delay register 104 and the first gate input 126 of the NAND gate 106. The delayed flow control signal from the control delay output 122 is connected to the storage chip enable input 114 of the sequential storage device 102 and the select line input 140 of the multiplexer 110. The inverted, delayed flow control signal from output 124 of the control delay register 104 is connected to the second gate input 128 of the NAND gate 106. The slack register clock enable signal from output 130 of the NAND gate 106 is connected to the slack register chip enable input 136 of the slack register 108. The data output 116 of the sequential storage device 102 is connected to the slack data input 132 of the slack register 108 and the first data input 142 of the multiplexer 110. The slack data output 138 of the slack register 108 is connected to the second data input 144 of the multiplexer 110. Multiplexer output 146 is connected to receiver input 156 of receiver (e.g., initiator) 112.

In one embodiment, circuit 100 may be implemented with a PCI bus. In this context, a receiver (e.g., initiator of a read operation) 112 may read a sequence of data items from a target sequential storage device 102 even when the set-up time afforded by the IRDY# signal (i.e., the flow control signal for the initiator in the PCI bus) is not sufficient for disabling and/or enabling the sequential storage device 102.

Clock inputs 113, 120, 134, 152 are connected to a clock signal 148 for synchronously driving circuit 100. In the context of a PCI bus, in one embodiment, the clock signal 148 is a 66 MHZ PCI clock signal. The flow control signal 150 (e.g., an IRDY# signal), which is a signal that controls the flow of data out of the sequential storage device 102, is outputted from flow control output 154 and applied to the control delay input 118 and the first gate input 126. By asserting (Low state) flow control signal 150, the receiver (in this case initiator of a read operation) 112 indicates that it will read the data item at multiplexer output 146 in response to the next clock trigger. Conversely, when the flow control signal 150 is deasserted (i.e., IRDY# is in the High state), the initiator will not read any more data items at the multiplexer output 146 until the flow control signal 150 is asserted once more. Thus, the flow control signal 150 is used to control the flow of data items out of sequential storage device 102.

1. Sequential Storage Device

Sequential storage device 102 stores the sequence of data items that are to be transferred to the initiator. A "data item" may be any amount of data that is transferred out of the sequential storage device 102 during a particular clock cycle. For example, a data item could include but is not limited to a bit, a byte, a 32-bit word, and a 64-bit word (which could be the case in a 64-bit PCI system). For simplicity, FIG. 2 shows components and data lines for transferring a single bit data item. However, persons of ordinary skill will recognize that circuit 100, with sufficient n-bit components and/or suitable parallel structure, will apply to any n-bit system. In one embodiment, sequential storage device 102 is a buffer that receives the data items from a host bus target. However, sequential storage device 102 may be any sequential storage device, including but not limited to a FIFO buffer, a RAM, a sequential addressing memory device, a register, a register array, a sequential addressing register array, a register cascade, and a latch. The storage chip enable input 114 (which is active Low in the embodiment shown in FIG. 2) enables a data item to be clocked onto data output 116 in response to a clock trigger applied to storage clock input 113.

2. Control Delay Register

Control delay register 104 is used to delay to the next clock cycle the enablement (and disablement) of sequential storage device 102 in response to an assertion (and deassertion, respectively) of flow control signal 150. This delay ensures that an enabling/disabling signal with a sufficient set-up time is applied to storage chip enable input 114. The control delay register 104 may be any sequential device that is capable of latching a flow control signal 150, which may provide a very small set-up time (e.g., 3 nanoseconds) relative to a clock trigger from a clock signal 148. The control delay register 104 could be, but is not limited to, a latch, a flip flop, or a register.

In one embodiment, the control delay register 104 is a rising edge-triggered D flip flop. When a clock trigger (e.g., the rising edge 160 of a clock signal 148 (see FIG. 3)) occurs, control delay register 104 passes the flow control signal at control delay input 118 through to control delay output 122. Likewise, the control delay register 104 passes the inverse of the value present at control delay input 118 (concurrent with a clock trigger) through to slack-save output 124.

3. Slack Register

Slack register 108 saves the data item that is on data output 116 when the flow control signal is deasserted. Slack register 108 may be any sequential device that is capable of latching a data item from data output 116 into slack output 138 in response to a deassertion of a flow control signal 150. A clock trigger will latch a data item at slack data input 132 to the slack data output 138, if slack register 108 is enabled at slack chip enable input 136 sufficiently prior to the clock trigger occurring at slack clock input 134. Thus, slack register 108 must be fast, because the available set up time following a low signal at slack chip enable input 136 relative to a clock trigger from clock signal 148 will be even smaller than that available at control delay input 118, due to the added propagation delay between flow control signal 150 and the output of NAND gate 106. The function of the NAND gate 106 is to generate a clock enable to the slack register whenever IRDY# becomes deasserted. As shown in FIG. 2, a NAND gate 106, rather than an AND gate, is used because the chip enable in this circuit 100 is an active Low. Slack register 108 could be, but is not limited to, a latch, a flip flop, or a register.

4. Multiplexer

Multiplexer 110 provides the receiver (e.g., initiator) 112 access to the sequence of data items through multiplexer output 146, which is selectively connected to either the data output 116 or the slack output 138. In the depicted embodiment, multiplexer 110 is not clocked. Thus, it may be presumed, the multiplexer 110 connects without significant delay the multiplexer output 146 with the selected signal at either the slack chip enable output 136 or data output 116. As configured in FIG. 2, a Low or "active" signal at control delay output 122 selects the data output 116 to appear at multiplexer output 146. Conversely, a High or "inactive" signal at control delay output 122 selects the data item at slack output 138 to appear at the multiplexer output 146.

Multiplexer 110 may be any conventional multiplexer or switch that is suitable for switching between the data output 116 and the slack output 138. Multiplexer 110 may be asynchronous, as is depicted in FIG. 2, or alternatively, it may include a latch for synchronously storing the value at the multiplexer output 146.

5. Receiver

Receiver 112 receives data from multiplexer output 146 and ultimately from sequential storage device 102. In the depicted embodiment, receiver 112 reads (e.g., stores in a buffer) a data item that is at multiplexer output 146 in response to a clock trigger if flow control signal 150 is asserted concurrent with the clock trigger. In the following exemplary operation section, as well as in the depicted embodiment, receiver 112 is the initiator in an initiator read transaction on a PCI bus. However, a "receiver" may be any device that receives (e.g., processes and/or stores) data from a sequential storage device.

B. Operation

Figure 3:
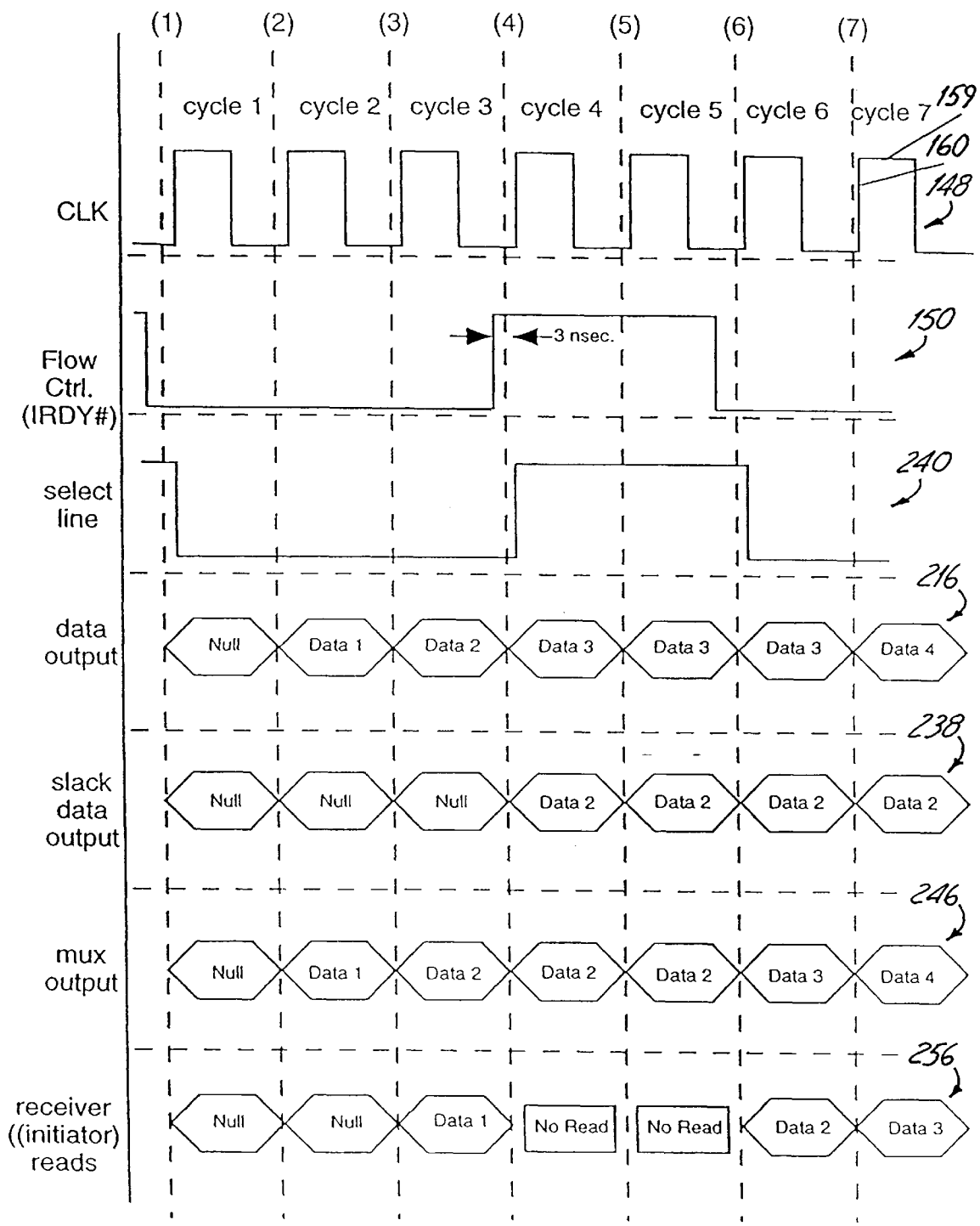
FIG. 3 is a timing diagram showing an exemplary operation of the circuit of FIG. 2.

With reference to FIGS. 2 and 3, the operation of circuit 100 will now be described in response to an exemplary clock signal 148 and an exemplary flow control (IRDY#) signal 150 which are depicted in FIG. 3. FIG. 3 is a timing diagram that will be used to explain the operation of the circuit 100 in the context of an exemplary initiator read operation with a 66 MHZ PCI bus. FIG. 3 shows a clock signal 148 having a plurality of clock pulses 159, with each clock pulse 159 having a rising edge 160. Also shown is a flow control signal 150, which for purposes of this example is a PCI IRDY# signal, and a select line signal 240 indicating the state of the select line input 140 of the multiplexer 110. In addition, FIG. 3 diagrammatically shows data items present at various locations within circuit 100 during various clock cycles. Data items 216 are output at data output 116 of the sequential storage device 102; data items 238 are output at slack output 138 of the slack register 108; data items 246 are output at multiplexer output 146 of the multiplexer 110; and data items 256 (if any) that have been read by receiver 112 for each clock cycle.

1. Asserted IRDY#

An IRDY# signal 150 in a Low state (i.e., as shown in cycles 1, 2, and in part of cycle 3) indicates that an initiator is ready to read a data item and will do so upon the following clock trigger. (A "clock trigger" is the part of a clock cycle that causes sequential circuitry to transition from a current state to the next state. In this example, a clock trigger occurs at the rising edge 160 of each clock pulse 159.) Responsive to IRDY# signal 150 being asserted (i.e., in the Low state) at the time of a clock trigger, the control delay register 104 clocks the Low signal at the control delay input 118 through to the control delay output 122. This Low signal is provided to the storage chip enable input 114 of sequential storage device 102 and the select line input 140 of multiplexer 110. With the storage chip enable input 114 being in a Low state, the sequential storage device 102 becomes enabled to sequentially clock the next data item (in a sequence of data items) onto the data output 116 responsive to each clock trigger that is applied to the storage clock input 113.

The Low signal at control delay output 122 also causes the multiplexer 110 to select the data output 116 at the first data input 142 (rather than the slack output 138 at the second data input 144) for output to the multiplexer output 146, which is made available to the initiator. With IRDY# signal 150 in a Low state, circuit 100 will continuously clock data items to be read by the initiator directly from a storage device out to multiplexer output 146. (It is recognized that within a PCI bus context, both a TRDY# (not shown), as well as an IRDY#, must be asserted for data to be transferred between an initiator and its target. Thus, for ease of understanding, it is assumed that a TRDY# signal, as well as any other necessary signals, are asserted when analyzing circuit 100 in this example.)

As long as the IRDY# signal 150 is asserted (i.e., in a Low state), the slack register 108 does not store data items output onto the data output 116. The reason these data items are not stored in the slack register when the IRDY# signal 150 is asserted is because the slack register 108 is disabled during this time period. With reference to FIG. 3, during cycles 1, 2, and a portion of 3, when the IRDY# signal 150 is asserted, the slack register 108 is disabled.

With reference to FIG. 2, how the slack register 108 is disabled when the IRDY# signal 150 is asserted will be described. As shown in FIG. 2, the IRUDY# signal 150 is input to the first gate input 126 of the NAND gate 106. The NAND gate 106 will only output a Low state when both its inputs 126, 128 are in a High state. Otherwise, the NAND gate 106 will output via the gate output 130 a High state. When the IRDY# signal 150 is asserted (i.e., in a Low state), the NAND gate 106 will output via the gate output 130 a High state. This High state is applied to the slack chip enable input 136. Because the slack chip enable is an active Low chip enable, the High state applied at the slack chip enable input 136 disables the slack register 108.

2. IRDY Deassertion Transition

With reference to FIG. 3, the operation of the circuit 100 when the IRDY# signal 150 is deasserted (i.e., transitions to a High state as during cycle 3) will be described. As shown in FIG. 3, the IRDY# signal 150 is deasserted in cycle 3 just prior to (i.e., 3 nsec. before) the fourth clock trigger.

Immediately after IRDY# signal 150 is deasserted but prior to the fourth clock trigger, NAND gate 106 switches its output to a Low state because inverted and delayed flow control (e.g., IRDY#) output 124 (or second gate input 128), which is the complement of control delay output 122, is already in a High state and first gate input 126 (IRDY#) transitions from Low to High. With NAND output (i.e., slack chip enable input 136) switching to a Low state, slack register 108 becomes enabled and remains enabled until next clock trigger (4), albeit for a brief (less than 3 nanoseconds interval) until the slack-save output 124 is clocked to a Low state with the IRDY# signal 150 deasserted to a High state. However, the slack register 108 is enabled long enough to save the cycle 3 current data item (Data 2) at data output 116 by latching it to slack output 138. Data 2 is the current data item on data output 116 when the IRDY# signal 150 is deasserted. It is important that this data item be saved, because it otherwise will not be read by the initiator. With the IRDY# signal 150 being deasserted prior to the fourth clock trigger, the cycle 3 data item at multiplexer output 146 (i.e., Data 2) is prevented from being clocked into the initiator by the fourth clock trigger. This data item that would be lost due to the deassertion of the IRDY# signal 150 is referred to as an "overflow" (i.e. unread) data item. Regardless of whether the overflow data item (Data 2) at data output 116 has been saved, it will be replaced by the next data item (Data 3) in response to the fourth clock trigger, because sequential storage device 102 is not disabled during this clock trigger.

The clock trigger immediately following the deassertion of the IRDY# signal 150 (fourth clock trigger in FIG. 3) causes several things to happen. As just explained, it causes Data 2 to be latched through to slack output 138. In addition, this first post-deassertion clock trigger causes Data 3 to be clocked out of sequential storage device 102 and replace Data 2 at the data output 116. This post-deassertion clock trigger also latches the High IRDY# signal 150 through to the control delay output 122. This High state, when applied to the storage chip enable 114, disables sequential storage device 102 from clocking out a data item on a subsequent clock trigger until the IRDY# signal 150 is asserted once again. In addition, this High value, which is also applied to select line input 140, causes the multiplexer 110 to switch to the slack output 138 at second data input 144, thereby causing the initiator 112 to read Data 2 on the first clock trigger after the IRDY# signal 150 is again asserted.

3. IRDY# Reasserted

When IRDY# signal 150 is reasserted (at cycle 5), the overflow data item not read (but saved in slack register 108) from the IRDY# signal 150 deassertion in cycle 3 is at multiplexer output 146. Thus, the immediately following clock trigger (the sixth or first post-deassertion clock trigger) causes the initiator 112 to next read Data 2, which is the next data item in the sequence for it to read. In addition, this clock trigger causes the Low state from the asserted IRDY# signal 150 to be latched through to control delay output 122, which will enable the sequential storage device 102 for the subsequent clock trigger (seventh clock trigger). Therefore, because the sixth clock trigger could not clock a fresh data item out to data output 116, Data 3 remains there for the next clock trigger, which is the seventh clock trigger. The clock trigger in cycle 6, by switching control delay output 122 to a Low state does cause the multiplexer 110 to now restore as its multiplexer output 146 the data output 116 received at its first data input 142. Thus, Data 3 is present at multiplexer output 146 when the seventh clock trigger occurs. This allows the initiator 112 to read Data 3, which is the next data item in the sequence.

Thus, even with a minuscule IRDY# set-up time (e.g., 3 nsec.), circuit 100 allows each item in a data sequence to be read by the initiator 112 regardless of whether or how many times IRDY# is deasserted. It should be noted that in the depicted embodiment a delay is induced between the IRDY# signal 150 and valid data to be read by the initiator 112. This delay arises from the control delay register 104, which is used to delay to the next clock cycle the enablement/ disablement of sequential storage device 102 in response to an assertion of IRDY# signal 150.

It will be seen by those skilled in the art that various changes may be made without departing from the spirit and scope of the invention. For example, the primary embodiment is presented in terms of a PCI initiator read transaction with an initiator reading a sequence of items from a target sequential storage device. However, the invention is contemplated to encompass any sequential data transaction where the data flow of a sequential storage device is controlled by an independent flow control signal (e.g., a flow control signal associated with the other device in the transaction). In addition, the invention is not limited to data transactions occurring over a PCI bus; rather, it may apply to any sequential data transaction regardless of the particular data transfer environment. Moreover, a circuit of the present invention may be implemented in any suitable form, including but not limited to a combination of discrete components, a programmable logic device, or as part of an application specific integrated circuit ("ASIC") chip.

Accordingly, the invention is not limited to what is shown in the drawings and described in the specification but only as indicated in the appended claims.

What is claimed is:

1. A method of sequential data transfer, the method comprising:

outputting data from a sequential storage device having a data output to a receiver in response to a clock signal and to a flow control signal being asserted, wherein the clock signal is common to the receiver and the sequential storage device;

copying an item of data at the data output of the sequential storage device into a slack register in response to the flow control signal being deasserted, the item of data being subject to being overwritten by a next item of data after the flow control signal is deasserted when the sequential storage device has insufficient set-up time; and latching the copied data from the slack register to the receiver to be read prior to the next item of data when the flow control signal is again asserted.

2. The method of claim 1, wherein latching the copied data from the slack register to the receiver comprises latching the copied data from the slack register to a first input of a multiplexer which outputs the copied data to the receiver to be read when the flow control signal is again asserted, prior to the multiplexer outputting the next item of data at a second input of the multiplexer to the receiver to be read when the flow control signal is again asserted.

3. The method of claim 1, wherein copying the data comprises automatically copying the data at the data output of the sequential storage device in response to the flow control signal being deasserted.

4. The method of claim 3, wherein the copied data stored in the slack register is not replaced until the flow control signal is deasserted again.

5. The method of claim 1, wherein the sequential storage device is a host bus buffer.

6. The method of claim 1, wherein the receiver is a PCI agent.

7. The method of claim 6, wherein the sequential storage device is associated with a host bus, and the PCI agent is an initiator of a data read from the host bus.

8. A method of sequential data transfer, the method comprising:

a step for outputting data from a sequential storage device having a data output to a receiver in response to a clock signal and to a flow control signal being asserted, wherein the clock signal is common to the receiver and the sequential storage device;

a step for copying an item of data at the data output of the sequential storage device into a slack register in response to the flow control signal being deasserted, the item of data being subject to being overwritten by a next item of data after the flow control signal is deasserted when the sequential storage device has insufficient set-up time; and a step for latching the copied data from the slack register to the receiver to be read prior to the next item of data when the flow control signal is again asserted.

9. The method of claim 8, wherein the step for latching the copied data from the slack register to the receiver comprises a step for latching the copied data from the slack register to a first input of a multiplexer which outputs the copied data to the receiver to be read when the flow control signal is again asserted, prior to the multiplexer outputting the next item of data at a second input of the multiplexer to the receiver to be read when the flow control signal is again asserted.

10. The method of claim 8, wherein the step for copying the data comprises a step for automatically copying the data at the data output of the sequential storage device in response to the flow control signal being deasserted.

11. The method of claim 10, wherein the copied data stored in the slack register is not replaced until the flow control signal is deasserted again.

12. The method of claim 8, wherein the sequential storage device is a host bus buffer.

13. The method of claim 8, wherein the receiver is a PCI agent.

14. The method of claim 13, wherein the sequential storage device is associated with a host bus, and the PCI agent is an initiator of a data read from the host bus.

15. A circuit, comprising:

a sequential storage device, having a data output, to output data to a receiver in response to a clock signal and to a flow control signal being asserted, wherein the clock signal is common to the receiver and the sequential storage device; and a logic circuit, coupled to the sequential storage device and having a slack register, to copy an item of data at the data output of the sequential storage device in the slack register in response to the flow control signal being deasserted, the item of data being subject to being overwritten by a next item of data after the flow control signal is deasserted when the sequential storage device has insufficient set-up time, and to latch the copied data from the slack register to the receiver to be read prior to the next item of data when the flow control signal is again asserted.

16. The circuit of claim 15, further comprising a multiplexer having a first input coupled to the slack register, a second input coupled to the data output of the sequential storage device, and an output coupled to the receiver, wherein the logic circuit latches the copied data from the slack register to the first input of the multiplexer which outputs the copied data to the receiver to be read when the flow control signal is again asserted, prior to the multiplexer outputting the next item of data at the second input of the multiplexer to the receiver to be read when the flow control signal is again asserted.

17. The circuit of claim 15, wherein the logic circuit automatically copies the data at the data output of the sequential storage device in response to the flow control signal being deasserted.

18. The circuit of claim 17, wherein the copied data stored in the slack register is not replaced until the flow control signal is deasserted again.

19. The circuit of claim 15, wherein the sequential storage device is a host bus buffer.

20. The circuit of claim 15, wherein the receiver is a PCI agent.

21. The circuit of claim 20, wherein the sequential storage device is associated with a host bus, and the PCI agent is an initiator of a data read from the host bus.

22. A circuit for sequential data transfer, comprising:

means for outputting data from a sequential storage device having a data output to a receiver in response to a clock signal and to a flow control signal being asserted, wherein the clock signal is common to the receiver and the sequential storage device; and logic means, coupled to the sequential storage device and having a slack register, for copying an item of data at the data output of the sequential storage device into the slack register in response to the flow control signal being deasserted, the item of data being subject to being overwritten by a next item of data after the flow control signal is deasserted when the sequential storage device has insufficient set-up time, and latching the copied data from the slack register to the receiver to be read prior to the next item of data when the flow control signal is again asserted.

23. The circuit of claim 22, further comprising selecting means for data output selection, having a first input coupled to the slack register, a second input coupled to the data output of the sequential storage device, and an output coupled to the receiver, wherein the logic means latches the copied data from the slack register to the first input of the selecting means which outputs the copied data to the receiver to be read when the flow control signal is again asserted, prior to the selecting means outputting the next item of data at the second input of the selecting means to the receiver to be read when the flow control signal is again asserted.

24. The circuit of claim 22, wherein the logic means automatically copies the data at the data output of the sequential storage device in response to the flow control signal being deasserted.

25. The circuit of claim 22, wherein the copied data stored in the slack register is not replaced until the flow control signal is deasserted again.

26. The circuit of claim 22, wherein the sequential storage device is a host bus buffer.

27. The circuit of claim 22, wherein the receiver is a PCI agent.

28. The circuit of claim 27, wherein the sequential storage device is associated with a host bus, and the PCI agent is an initiator of a data read from the host bus.

* * * * *

UNITED STATES PATENT AND TRADEMARK OFFICE
CERTIFICATE OF CORRECTION

PATENT NO.    : 6,360,286 B1  
DATED         : March 19, 2002  
INVENTOR(S)   : Todd C. Houg It is certified that error appears in the above-identified patent and that said Letters Patent is hereby corrected as shown below:

Column 2,  
Line 9, reads "ERDY" should read -- IRDY --  
Line 16, reads "RDY" should read -- IRDY --

Column 6,  
Line 51, reads "IRUDY" should read -- IRDY --

Signed and Sealed this

Eleventh Day of February, 2003

JAMES E. ROGAN  
*Director of the United States Patent and Trademark Office*